United States Patent Office 3,470,152
Patented Sept. 30, 1969

3,470,152
5,6,11,12 - TETRAHYDRO - DIBENZO[b,f][1,5]DI-
AZOCINE - 6,12 - DIONES AND METHOD OF
PREPARATION
Ottmar Zipp, Frankfurt, and Josef Nickl, Hans Machleidt,
Johannes Keck, Gerd Kruger, Robert Engelhorn, and
Sigfrid Puschmann, Biberach an der Riss, Germany, as-
signors to Boehringer Ingelheim G.m.b.H., Ingelheim
am Rhein, Germany, a corporation of Germany
No Drawing. Filed Oct. 21, 1966, Ser. No. 588,330
Claims priority, application Germany, Oct. 21, 1965,
T 29,634; Apr. 21, 1966, T 30,962
Int. Cl. C07d 53/00; A61k 27/00
U.S. Cl. 260—239.3                                  9 Claims

ABSTRACT OF THE DISCLOSURE

The compounds are 11-aminoalkyl-5,6,11,12-tetra-
hydro-dibenzo[b,f][1,5]diazocine-6,12-diones and non-
toxic acid addition salts thereof, useful as antitussives
and antiemetics in warm-blooded animals.

---

This invention relates to novel 5,6,11,12-tetrahydro-
dibenzo[b,f][1,5]diazocine-6,12-diones and acid addition
salts thereof, as well as to various methods of preparing
these compounds.

More particularly, the present invention relates to a
novel class of 5,6,11,12-tetrahydro-dibenzo[b,f][1,5]
diazocine-6,12-dione substitution products of the formula (I)

wherein $R_1$, $R_2$, $R_3$ and $R_4$, which may be identical to or different
from each other, are each hydrogen, halogen, lower
alkyl or lower alkoxy,
$R_5$ is hydrogen, lower alkyl, lower alkenyl or aralkyl,
where the aryl moiety of said aralkyl may have one or
more halogen, lower alkyl or lower alkoxy substituent
attached thereto,
$R_6$ and $R_7$, which may be identical to or different from
each other, are alkyl, hydroxyalkyl, alkoxyalkyl, aryl,
aralkyl or, together with each other and the nitrogen
atom to which they are attached, form a 5- to 7-mem-
bered basic heterocyclic ring which may have one or
more lower alkyl substituents attached thereto, and
A is a bivalent acyclic hydrocarbon of 2 to 3 carbon
atoms, and non-toxic, pharmacologically acceptable acid addition
salts thereof.

The compounds embraced by Formula I above may be
prepared by any one of the following methods.

Method A

By reacting a 5,6,11,12-tetrahydro-dibenzo[b,f][1,5]-
diazocine-6,12-dione of the formula (II)

wherein $R_1$ through $R_5$ have the same meanings as in
Formula I, with an aminoalkyl halide of the formula $$\text{Hal}-A-N\begin{matrix}R_6\\R_7\end{matrix}$$

(III)

wherein $R_6$, $R_7$ and A have the same meanings as in
Formula I and Hal is halogen, in the presence of an an-
hydrous inorganic base, such as alkali metal hydroxides,
alkali metals, alkali metal hydrides or alkali metal amides.

The reaction may be carried out in the presence of an
inert anhydrous organic solvent at elevated temperatures,
preferably at the boiling point of the particular solvent
which is used. The formation of the desired end product
pursuant to this method may be accomplished in one of
two ways: either by first adding the anhydrous inorganic
base to the starting compound of the Formula II, thereby
forming the corresponding 11-alkali metal derivative of
Compound II, and subsequently reacting said alkali metal
derivative with a compound of the Formula III; or by
simultaneously adding the anhydrous inorganic base and
the compound of the Formula III to a hot solution of
starting Compound II. Examples of suitable inert anhy-
drous organic solvents for use in the first of the above
variants are aromatic hydrocarbons or dimethylform-
amide, and for the second variant acetone.

The reaction may, however, also be carried out espe-
cially advantageously in the presence of a polar solvent
containing hydroxyl groups, such as water or alcohols,
preferably at temperatures up to and including the boiling
point of the polar solvent. For the purpose of tying up or
neutralizing the hydrogn halide released by the reaction,
it is advantageous to add a sufficient amount of an in-
organic or organic base to the reaction mixture. Exam-
ples of suitable such bases are inorganic hydroxides, such
as alkali metal hydroxides; metal alcoholates, such as
alkali metal alcoholates; inorganic carbonates, such as
alkali metal carbonates; and organic bses, preferably or-
ganic quaternary ammonium hydroxides.

Method B

By reacting a 5,6,11,12-tetrahydro-dibenzo[b,f][1,5]-
diazocine-6,12-dione of the Formula II above with a di-
haloalkane of the formula Hal—A—Hal'                                  (IV)

wherein A has the same meanings as in Formula I above
and Hal and Hal' are identical or different halogens, and
subsequently reacting the 11-haloalkyl-benzo[b,f][1,5]-
diazocine-6,12-dione thus obtained with a secondary
amine of the formula $$HN\begin{matrix}R_6\\R_7\end{matrix}$$

(V)

wherein $R_6$ and $R_7$ have the same meanings as in For-
mula I.

The reaction between the tetrahydro-dibenzodiazocine-dione II and the dihaloalkane IV is carried out under the conditions set forth under method A above.

The reaction between the 11-haloalkyl-tetrahydro-dibenzodiazocinedione and the secondary amine V is carried out in the presence of an inert organic solvent at elevated temperatures, advantageously at the boiling point of the particular solvent which is used. Examples of suitable such solvents are aromatic hydrocarbons or aliphatic halohydrocarbons. The reaction is further advantageously carried out in the presence of a reaction accelerator, such as potassium iodide. The secondary amine V is preferably used in an amount in excess of the stoichiometrically required amount, and may under these conditions simultaneously serve as the solvent medium for the reaction.

Method C

By subjecting a compound of the formula

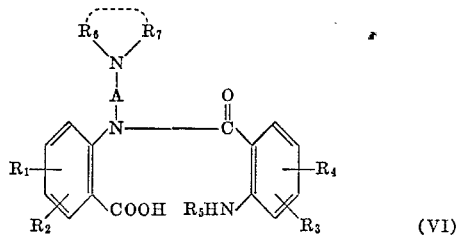

wherein $R_1$ through $R_7$ have the same meanings as in Formula I, to a cyclization reaction with carbodiimide or cyanamide.

The cyclization reaction with carbodiimide is carried out in the presence of an inert solvent at room temperature. When cyanamide is used as the cyclization agent, the reaction is carried out at elevated temperatures in the presence of an inert solvent, preferably at the boiling point of the particular solvent which is used. Examples of suitable solvents for either of these cyclization reactions are dioxane, dimethylformamide, tetrahydrofuran or chloroform.

In those instances where the cyclization reaction yields an end product of the Formula I wherein $R_5$ is hydrogen, this hydrogen atom may, if desired, subsequently be replaced by a lower alkyl, lower alkenyl or aralkyl radical pursuant to customary methods, such as by reacting said end product with a lower alkyl halide, lower alkenyl halide or aralkyl halide.

The starting compounds for methods A through C above are either known compounds or may be readily prepared by known methods.

Thus, a number of compounds of the Formula II wherein $R_5$ is lower alkyl are described in the literature; those which have not previously been described may readily be obtained by subjecting a corresponding anthranoyl-anthranilic acid derivative to a ring closure reaction with a carbodiimide, cyanamide or acetic acid anhydride. In this manner the following previously unknown compounds of the Formula II above were prepared:

5-methyl-8-bromo-5,6,11,12-tetrahydro-dibenzo[b,f][1,5]diazocine-6,12-dione; M.P. 242° C.
2-bromo-5-methyl-5,6,11,12-tetrahydro-dibenzo[b,f][1,5]diazocine-6,12-dione; M.P. 224° C.
5-ethyl-5,6,11,12-tetrahydro-dibenzo[b,f][1,5]diazocine-6,12-dione, M.P. 237–238° C.
5-propyl-5,6,11,12-tetrahydro-dibenzo[b,f][1,5]diazocine-6,12-dione; M.P. 185–189° C.
5-allyl-5,6,11,12-tetrahydro-dibenzo[b,f][1,5]diazocine-6,12-dione; M.P. 178–181° C.
5-benzyl-5,6,11,12-tetrahydro-dibenzo[b,f][1,5]diazocine-6,12-dione; M.P. 212° C.
2-chloro-5-methyl-5,6,11,12-tetrahydro-dibenzo[b,f][1,5]diazocine-6,12-dione; M.P. 236° C.
3-chloro-5-methyl-5,6,11,12-tetrahydro-dibenzo[b,f][1,5]diazocine-6,12-dione.
7-chloro-5-methyl-5,6,11,12-tetrahydro-dibenzo[b,f][1,5]diazocine-6,12-dione; M.P. 214° C.
8-chloro-5-methyl-5,6,11,12-tetrahydro-dibenzo[b,f][1,5]diazocine-6,12-dione; M.P. 246° C.
8-chloro-5-ethyl-5,6,11,12-tetrahydro-dibenzo[b,f][1,5]diazocine-6,12-dione; M.P. 130° C.
9-chloro-5-methyl-5,6,11,12-tetrahydro-dibenzo[b,f][1,5]diazocine-6,12-dione; M.P. 264° C.
9-chloro-5-ethyl-5,6,11,12-tetrahydro-dibenzo[b,f][1,5]diazocine-6,12-dione; M.P. 217° C.
10-chloro-5-methyl-5,6,11,12-tetrahydro-dibenzo[b,f][1,5]diazocine 6,12-dione; M.P. 265° C.
3,9-dichloro-5-methyl-5,6,11,12-tetrahydro-dibenzo[b,f][1,5]diazocine-6,12-dione; M.P. 145° C.

The starting compounds of the Formula VI above may readily be prepared pursuant to known methods, such as by reducing a corresponding N-aminoalkyl-N-(2-nitrobenzoyl)-anthranilic acid ester and subsequently hydrolyzing the reduction product to form the corresponding carboxylic acid. For instance, N-(2-diethylamino-ethyl)-N-anthranoyl-anthranilic acid methyl ester (M.P. 91° C.) may be prepared by reacting N-(2-diethylamino-ethyl)-anthranilic acid methyl ester with 2-nitrobenzoyl chloride to form N-(2-diethylamino-ethyl)-N-(2-nitrobenzoyl)-anthranilic acid methyl ester (M.P. 86–87° C.), and subjecting the latter to catalytic reduction.

The compounds of the Formula I above are organic bases and therefore form acid addition salts with inorganic or organic acids. Examples of non-toxic, pharmacologically acceptable acid addition salts include, but are not limited to, those formed with hydrochloric acid, hydrobromic acid, sulfuric acid, phosphoric acid, lactic acid, citric acid, tartaric acid maleic acid, 8-chlorotheophylline and the like.

The following examples further illustrate the present invention and will enable others skilled in the art to understand it more completely. It should be understood, however, that the invention is not limited to the particular examples given below.

Example 1.—Preparation of 5-methyl-11-[3-(4-methyl-piperazino) - n - propyl]5,6,11,12-tetrahydro-dibenzo[b,f][1,5]diazocine-6,12-dione by method A A mixture of 7.6 gm. of 5-methyl-5,6,11,12-tetrahydro-dibenzo[b,f][1,5]diazocine-6,12-dione, 1.44 gm. o f sodium hydride and 100 cc. of xylene was refluxed for 90 minutes. Thereafter, the reaction mixture was allowed to cool, 5.3 gm. of 3-(4-methyl-piperazino)-n-propyl chloride were added thereto, and the resulting mixture was refluxed three hours more. Subsequently, the xylene was distilled off, the residue was taken up in 2 N hydrochloric acid, insoluble matter was separated by filtration, the filtrate was admixed with 20 cc. of 4 N sodium hydroxide, and the oil precipitated thereby was taken up in ethyl acetate. The resulting solution was washed with water and dried, and then the solvent was distilled off. The initially oily residue crystallized upon being admixed with ether. The crystalline product was identified to be 5-methyl-11-[3-(4-methyl-piperazino) - n - propyl]-5,6,11,12-tetrahydro-dibenzo[b,f][1,5]diazocine - 6,12 - dione, M.P. 114° C., of the formula

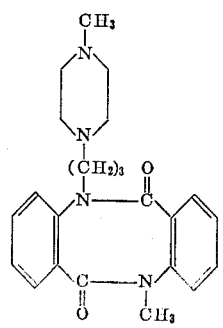

Example 2.—Preparation of 8-bromo-5-methyl-11-[3-(4-methyl-piperazino) - n - propyl]-5,6,11,12-tetrahydro-dibenzo[b,f][1,5]diazocine-6,12-dione and its dihydrochloride by method A A mixture of 8-bromo-5-methyl-5,6,11,12-tetrahydro-dibenzo[b,f][1,5]diazocine-6,12-dione, 0.8 gm. of 50% sodium amide and 60 cc. of xylene was refluxed for one hour. Thereafter, the reaction mixture was allowed to cool, 1.8 gm. of 3-(4-methyl-piperazino)-n-propyl chloride were added, and the resulting mixture was refluxed for three hours more. The reaction mixture was then filtered, the xylene was distilled from the filtrate, and the residue, 8 - bromo-5-methyl-11-[3-(4-methyl-piperazino)-n-propyl] - 5,6,11,12 - tetrahydro - dibenzo[b,f][1,5]diazocine-6,12-dione, was taken up in ethylacetate. The resulting solution was acidified with hydrochloric acid, whereby a precipitate was formed which was isolated and identified to be the dihydrochloride, M.P. 263° C. (decomposition), of the formula

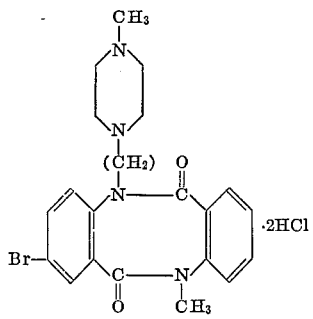

Example 3.—Preparation of 5-ethyl-11-(2-diethylamino-ethyl) - 5,6,11,12 - tetrahydro - dibenzo[b,f][1,5]diazocine-6,12-dione by method A 2.8 gm. of powdered potassium hydroxide and 2.72 gm. of 2-diethylamino-ethyl chloride were added to a hot solution of 2.66 gm. of 5-ethyl-5,6,11,12-tetrahydro-dibenzo[b,f][1,5]diazocine-6,12-dione in 150 cc. of acetone. The resulting mixture was refluxed for 30 minutes, then filtered, and the solvent was distilled from the filtrate in vacuo. The residue was taken up in a mixture of ethylacetate and sodium hydroxide, and the organic phase was extracted with 3 N hydrochloric acid. The aqueous acid extract solution was adjusted to pH 9–10 with sodium carbonate, saturated with sodium chloride, the oil precipitated thereby was taken up in ethylacetate, and the resulting solution was dried and evaporated. The residue was recrystallized from petroleum ether, yielding 5-ethyl-11-(2-diethylamino-ethyl)-5,6,11,12 - tetrahydro-dibenzo[b,f][1,5]diazocine-6,12-dione, M.P. 83° C., of the formula

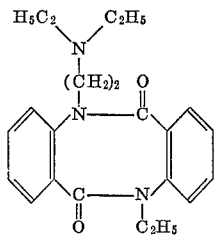

Example 4.—Preparation of 5-methyl-11-[3-morpholino-n-propyl] - 5,6,11,12 - tetrahydro - dibenzo[b,f][1,5]diazocine-6,12-dione by method B A solution of 10 gm. of 5-methyl-5,6,11,12-tetrahydro-dibenzo[b,f][1,5]diazocine-6,12-dione in 120 cc. of dimethylformamide was admixed with 2.2 gm. of 50% sodium hydride by stirring. The resulting clear solution of the 11-sodium salt was admixed with 9.5 gm. of 1-bromo-3-chloropropane, and the mixture was heated for 20 minutes at 100° C. Thereafter, the new neutral solution was poured into water, whereby an oily precipitate was formed which, after decanting the supernatant liquid, was digested with methanol. The methanolic solution was filtered, the filtrate was admixed with water, and the precipitate formed thereby was collected and recrystallized from a mixture of benzene and petroleum ether, yielding 5-methyl-11-(3-chloro-n-propyl) - 5,6,11,12 - tetrahydro-dibenzo[b,f][1,5]diazocine-6,12-dione, M.P. 108–110° C.

1.1 gm. of the product thus obtained were boiled for 15 hours with 0.64 gm. of morpholine in a mixture of 25 cc. of benzene and 5 cc. of chloroform in the presence of 100 mgm. of potassium iodide. Thereafter, the reaction mixture was evaporated, and the residue was taken up in a mixture of benzene and water. The benzene phase was extracted with 2 N hydrochloric acid, the aqueous acid extraction solution was made alkaline with 4 N sodium hydroxide, and the alkaline solution was extracted with benzene. The extract solution was evaporated, the oily residue was taken up in ether, and the reaction product was allowed to crystallize therefrom, yielding 5-methyl-11 - (3 - morpholino - n - propyl)-5,6,11,12-tetrahydro-dibenzo[b,f][1,5]diazocine-6,12-dione, M.P. 124–126° C., of the formula

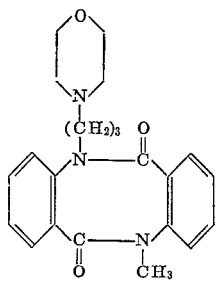

Example 5

Using a procedure analogous to that described in Example 1, 5-methyl-11-(2-diethylamino-ethyl) - 5,6,11,12-tetrahydro-dibenzo[b,f][1,5]diazocine-6,12 - dione, M.P. 95° C., was prepared from 5-methyl-5,6,11,12-tetrahydro-dibenzo[b,f]diazocine-6,12-dione and 2-diethylamino-ethyl chloride.

Example 6

Using a procedure analogous to that described in Example 1, 5-methyl-11-(2-dimethylamino-ethyl)-5,6,11,12-tetrahyro-dibenzo[b,f][1,5]diazocine-6,12 - dione, M.P. 140° C., was prepared from 5-methyl-5,6,11,12-tetrahydro-dibenzo[b,f][1,5]diazocine-6,12 - dione and 2 - dimethylamino-ethyl chloride.

Example 7

Using a procedure analogous to that described in Example 1, 5-methyl-11-(3-dimethylamino-n-propyl)-5,6,11,12-tetrahydro-dibenzo[b,f][1,5]diazocine - 6,12 - dione, M.P. 124° C., was prepared from 5-methyl-5,6,11,12-tetrahydro-dibenzo[b,f][1,5]diazocine-6,12-dione and 3 - dimethylamino-n-propyl chloride.

Example 8

Using a procedure analogous to that described in Example 1, 5-methyl-11-(3-pyrrolidino-n-propyl)-5,6,11,12-tetrahydro-dibenzo[b,f][1,5]diazocine-6,12 - dione, M.P. 100° C., of the formula

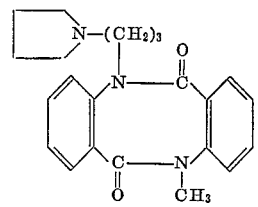

was prepared from 5-methyl-5,6,11,12-tetrahydro-dibenzo[b,f][1,5]diazocine-6,12-dione and 3-pyrrolidino-n-propyl chloride.

Example 9

Using a procedure analogous to that described in Example 1, 5-methyl-11-(3-piperidino-n-propyl)-5,6,11,12-tetrahydrobenzo[b,f][1,5]-diazocine-6,12 - dione, M.P. 125° C., of the formula

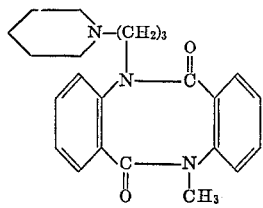

was prepared from 5-methyl-5,6,11,12-tetrahydro-dibenzo[b,f][1,5]diazocine-6,12-dione and 3-piperidino-n-propyl chloride.

Example 10

Using a procedure analogous to that described in Example 1, 5-methyl-11-(2-morpholino - ethyl) - 5,6,11,12-tetrahydro-dibenzo[b,f][1,5]diazocine-6,12 - dione, M.P. 176° C., was prepared from 5-methyl-5,6,11,12-tetrahydro-dibenzo[b,f][1,5]diazocine-6,12 - dione and 2 - morpholino-ethyl chloride.

Example 11

Using a procedure analogous to that described in Example 1, 5-ethyl-11-(3-dimethylamino-n-propyl) - 5,6,11, 12-tetrahydro-dibenzo[b,f][1,5]diazocine - 6,12 - dione, M.P. 140–142° C., was prepared from 5-ethyl-5,6,11,12-tetrahydro-dibenzo[b,f][1,5]diazocine-6,12 - dione and 3-diethylamino-n-propyl chloride.

Example 12

Using a procedure analogous to that described in Example 1, 5-methyl-8-bromo-11-(2-morpholino-ethyl)-5,6,11,12-tetrahydro-dibenzo[b,f][1,5]diazocine-6,12 - dione, M.P. 236° C., (decomposition), was prepared from 5-methyl-8-bromo-5,6,11,12-tetrahydro - dibenzo[b,f][1,5]diazocine-6,12-dione and 2-morpholino-ethyl chloride.

Example 13

Using a procedure analogous to that described in Example 1, 5-methyl-8-bromo-11-(2-diethylamino-ethyl)-5,6,11,12-tetrahydro-dibenzo[b,f][1,5]diazocine-6,12 - dione, M.P. 103° C., was prepared from 5-methyl-8-bromo-5,6,11,12-tetrahydro-dibenzo[b,f][1,5]diazocine-6,12 - dione and 2-diethylaminoethyl chloride.

Example 14

Using a procedure analogous to that described in Example 1, 5-methyl-8-bromo-11-(3 - dimethylamino - n-propyl)-5,6,11,12-tetrahydro - dibenzo[b,f][1,5]diazocine-6,12-dione, M.P. 81° C., was prepared from 5-methyl-8-bromo-5,6,11,12-tetrahydro - dibenzo[b,f][1,5]diazocine-6,12-dione and 3-dimethylamino-n-propyl chloride.

Example 15

Using a procedure analogous to that described in Example 1, 5-methyl-8-bromo-11-(3-piperidino-n-propyl)-5,6,11,12-tetrahydro-dibenzo[b,f][1,5-]diazocine - 6,12 - dione, M.P. 73° C., was prepared from 5-methyl-8-bromo-5,6,11,12-tetrahydro-dibenzo[b,f][1,5]diazocine-6,12 - dione and 3-piperidino-n-propyl chloride.

Example 16

Using a procedure analogous to that described in Example 1, 2-bromo-5-methyl-11-(2-diethylamino-ethyl)-5,6,11,12-tetrahydro-dibenzo[b,f][1,5]diazocine - 6,12 - dione, M.P. 119° C., of the formula

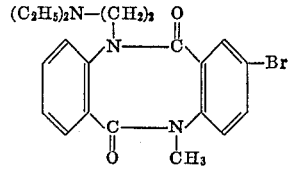

was prepared from 2-bromo-5-methyl-5,6,11,12-tetrahydro-dibenzo[b,f][1,5]diazocine-6,12-dione and 2-diethylaminoethyl chloride.

Example 17

Using a procedure analogous to that described in Example 1, 2-bromo-5-methyl-11-(3-morpholino-n-propyl)-5,6,11,12-tetrahydro-dibenzo[b,f][1,5]diazocine-6,12 - dione, M.P. 146° C., was prepared from 2-bromo-5-methyl-5,6,11,12-tetrahydro-dibenzo[b,f][1,5]diazocine-6,12 - dione and 3-morpholino-n-propyl chloride.

Example 18

Using a procedure analogous to that described in Example 1, 5-n-propyl-11-(2-dimethylamino-ethyl) - 5,6,11, 12-tetrahydro-dibenzo[b,f][1,5]diazocine - 6,12 - dione, M.P. 60° C., (decomposition) of the formula

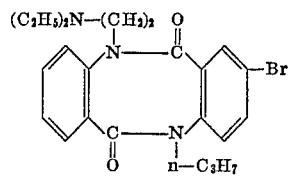

was prepared from 5-n-propyl-5,6,11,12-tetrahydro-dibenzo[b,f][1,5]diazocine-6,12-dione and 2-diethylaminoethyl chloride.

Example 19

Using a procedure analogous to that described in Example 1, 5-n-propyl-11-[3-(4-methyl-piperazino)-n-propyl] - 5,6,11,12 - tetrahydro-dibenzo[b,f][1,5]diazocine-6,12-dione was prepared from 5-n-propyl-5,6,11,12-tetrahydro-dibenzo[b,f][1,5]diazocine-6,12-dione and 3-(4-methyl-piperazino)-n-propyl chloride. Its hydrochloride had a melting point of 260–262° C. (decomposition).

Example 20

Using a procedure analogous to that described in Example 1, 5-allyl - 11-[3-(4-methyl-piperazino)-n-propyl]-5,6,11,12 - tetrahydro-dibenzo[b,f][1,5]diazocine-6,12-dione of the formula

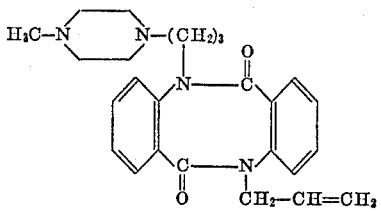

was prepared from 5-allyl-5,6,11,12-tetrahydro-dibenzo[b,f][1,5]diazocine-6,12-dione and 3-(4-methyl-piperazino)-n-propyl chloride. Its dihydrochloride had a melting point of 252° C.

Example 21

Using a procedure analogous to that described in Example 1, 5-benzyl - 11-[3-(4-methyl-piperazino)-n-propy]-

5,6,11,12 - tetrahydro - dibenzo[b,f][1,5]diazocine-6,12-dione of the formua

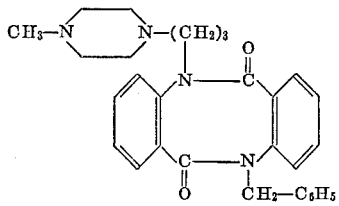

was prepared from 5-benzyl-5,6,11,12-tetrahydro-dibenzo[b,f][1,5]diazocine - 6,12 - dione and 3-(4-methyl-piperazino)-n-propyl chloride. Its bis-maleate had a melting point of 165–166° C.

Example 22

Using a procedure analogous to that described in Example 1, 2-chloro-5-methyl-11-[3-(4-methyl-piperazino)-n-propyl]-5,6,11,12 tetrahydro - dibenzo[b,f][1,5]diazocine-6,12-dione of the formula

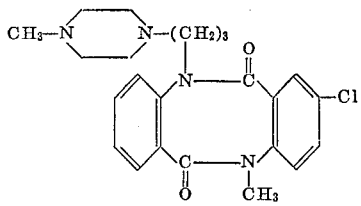

was prepared from 2-chloro-5-methyl-5,6,11,12-tetrahydrodibenzo[b,f][1,5]diazocine-6,12-dione and 3-(4-methyl-piperazino-n-propyl chloride. Its bis-maleate had a melting point of 169° C.

Example 23

Using a procedure analogous to that described in Example 1, 2-chloro-5-methyl-11-(2-diethylamino-ethyl)-5,6,11,12 - tetrahydro - dibenzo[b,f][1,5]diazocine-6,12-dione, M.P. 103° C., was prepared from 2-chloro-5-methyl-5,6,11,12-tetrahydro-dibenzo[b,f][1,5]diazocine -6,12 - dione and 2-diethylamino-ethyl chloride.

Example 24

Using a procedure analogous to that described in Example 1, 5-methyl - 7 - chloro-11-(2-morpholino-ethyl)-5,6,11,12-tetrahydro - dibenzo[b,f][1,5]diazocine - 6,12-dione, M.P. 157° C., of the formula

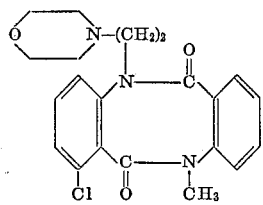

was prepared from 5-methyl-7-chloro-5,6,11,12-tetrahydro-dibenzo[b,f][1,5]diazocine - 6,12 - dione and 2-morpholino-ethyl chloride.

Example 25

Using a procedure analogous to that described in Example 1, 5-methyl-7-chloro-11-[3-(4-methyl-piperazino)-n-propyl] - 5,6,11,12 - tetrahydro - dibenzo[b,f][1,5]diazocine-6,12-dione was prepared from 5-methyl-7-chloro-5,6,11,12-tetrahydro-dibenzo[b,f][1,5]diazocine-6,12 - dione and 3-(4-methyl-piperazino)-n-propyl chloride. Its bis-maleate had a melting point of 170° C.

Example 26

Using a procedure analogous to that described in Example 1, 5-methyl-8-chloro-11-[3-(4-methyl-piperazino)-n-propyl] - 5,6,11,12 - tetrahydro-dibenzo[b,f][1,5]diazocine-6,12-dione was prepared from 5-methyl-8-chloro-5,6,-11,12-tetrahydro - dibenzo[b,f][1,5]diazocine - 6,12-dione and 3-(4-methyl-piperazino)-n-propyl chloride. Its bis-maleate had a melting point of 170° C.

Example 27

Using a procedure analogous to that described in Example 1, 5-methyl - 8 - chloro-11-(3-dimethylamino-n-propyl)-5,6,11,12 - tetrahydro - dibenzo[b,f][1,5]diazocine-6,12-dione, a non-distillable oil, was prepared from 5-methyl - 8 - chloro - 5,6,11,12-tetrahydro-dibenzo[b,f][1,5]diazocine-6,12-dione and 3-dimethylamino-n-propyl chloride.

Example 28

Using a procedure analogous to that described in Example 1, 5 - methyl-8-chloro-11-(3-morpholino-n-propyl)-5,6,11,12-tetrahydro-dibenzo[b,f][1,5]diazocine - 6,12-dione, a non-distillable oil, was prepared from 5-methyl-8-chloro-5,6,11,12-tetrahydro - dibenzo[b,f][1,5]diazocine-6,12-dione and 3-morpholino-n-propyl chloride.

Example 29

Using a procedure analogous to that described in Example 1, 5-methyl-8-chloro - 11-(2-diethylamino-ethyl)-5,6,11,12 - tetrahydro - dibenzo[b,f][1,5]diazocine-6,12-dione, a non-distillable oil, was prepared from 5-methyl-8-chloro - 5,6,11,12-tetrahydro - dibenzo[b,f][1,5]diazocine-6,12-dione and 2-diethylamino-ethyl chloride.

Example 30

Using a procedure analogous to that described in Example 1, 5-ethyl-8-chloro - 11-[3-(4-methyl-piperazino)-n-propyl) - 5,6,11,12 - tetrahydro-dibenzo[b,f][1,5]diazocine-6,12-dione was prepared from 5-ethyl-8-chloro-5,6,-11,12-tetrahydro-dibenzo[b,f][1,5]diazocine - 6,12 - dione and 3-(4-methyl-piperazino) - n - propyl chloride. Its bis-maleate had a melting point of 169° C.

Example 31

Using a procedure analogous to that described in Example 1, 5-methyl-9-chloro-11-[3-(4-methyl-piperazino)-n-propyl] - 5,6,11,12 - tetrahydro - dibenzo[b,f][1,5]diazocine-6,12-dione of the formula

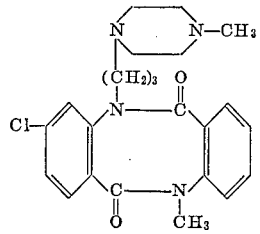

was prepared from 5-methyl-9-chloro-5,6,11,12-tetrahydrodibenzo[b,f][1,5]diazocine-6,12-dione and 3-(4-methylpiperazino)-n-propyl chloride. Its bis-maleate had a melting point of 170° C.

Example 32

Using a procedure analogous to that described in Example 1, 5-methyl-9-chloro-11-(3-dimethylamino-n-propyl) - 5,6,11,12 - tetrahydro - dibenzo[b,f][1,5]diazocine-6,12-dione, M.P. 163° C., was prepared from 5-methyl-9-chloro - 5,6,11,12 - tetrahydro-dibenzo[b,f][1,5]diazocine-6,12-dione and 3-dimethylamino-n-propyl chloride.

Example 33

Using a procedure analogous to that described in Example 1, 5-methyl - 9 - chloro-11-(3-piperidino-n-propyl)-5,6,11,12 - tetrahydro - dibenzo[b,f][1,5]diazocine - 6,12-dione, M.P. 112° C., was prepared from 5-methyl-9-chloro-5,6,11,12-tetrahydro - dibenzo[b,f][1,5]diazocine-6,12-dione and 3-piperidino-n-propyl chloride.

Example 34

Using a procedure analogous to that described in Example 1, 5-methyl-9-chloro-11-(3-morpholino-n-propyl)-

5,6,11,12 - tetrahydro - dibenzo[b,f][1,5]diazocine - 6,12-dione, M.P. 132° C., was prepared from 5-methyl-9-chloro-5,6,11,12-tetrahydro - dibenzo[b,f][1,5]diazocine-6,12-dione and 3-morpholino-n-propyl chloride.

Example 35

Using a procedure analogous to that described in Example 1, 5-methyl - 9 - chloro-11-(2-diethylamino-ethyl)-5,6,11,12 - tetrahydro - dibenzo[b,f][1,5]diazocine - 6,12-dione, M.P. 132° C., was prepared from 5-methyl-9-chloro-5,6,11,12-tetrahydro - dibenzo[b,f][1,5]diazocine-6,12-dione and 2-diethylamino-ethyl chloride.

Example 36

Using a procedure analogous to that described in Example 1, 5-methyl-9-chloro-11-(2-morpholino-ethyl)-5,6,11,12 - tetrahydro - dibenzo[b,f][1,5]diazocine-6,12-dione, M.P. 175° C., was prepared from 5-methyl-9-chloro-5,6,11,12-tetrahydro - dibenzo[b,f][1,5]diazocine-6,12-dione and 2-morpholino-ethyl chloride.

Example 37

Using a procedure analogous to that described in Example 1, 5-ethyl-9-chloro-11-[3-(4-methyl-piperazino)-n-propyl]-5,6,11,12 - tetrahydro - dibenzo[b,f][1,5]diazocine-6,12-dione was prepared from 5-ethyl-9-chloro-5,6,11,12-tetrahydrodibenzo[b,f[1,5]diazocine-6,12-dione and 3-(4-methylpiperazino)-n-propyl chloride. Its bis-maleate had a melting point of 166° C.

Example 38

Using a procedure analogous to that described in Example 1, 5-ethyl-9-chloro-11-(2-diethylamino-ethyl)-5,6,11,12 - tetrahydro - dibenzo[b,f][1,5]diazocine - 6,12-dione, M.P. 121° C., was prepared from 5-ethyl-9-chloro-5,6,11,12 - tetrahydro - dibenzo[b,f][1,5]diazocine - 6,12-dione and 2-diethylamino-ethyl chloride.

Example 39

Using a procedure analogous to that described in Example 1, 5-ethyl-9-chloro-11-(3-dimethylamino-n-propyl)-5,6,11,12-tetrahydro - dibenzo[b,f][1,5]diazocine-6,12-dione, M.P. 106° C., was prepared from 5-ethyl-9-chloro-5,6,11,12-tetrahydro - dibenzo[b,f][1,5]diazocine-6,12-dione and 3-dimethylamino-n-propyl chloride.

Example 40

Using a procedure analogous to that described in Example 1, 5-ethyl-9-chloro-11-(3-morpholino-n-propyl)-5,6,11,12 - tetrahydro - dibenzo[b,f][1,5]diazocine-6,12-dione, a nondistillable oil, was prepared from 5-ethyl-9-chloro-5,6,11,12-tetrahydro - dibenzo[b,f][1,5]diazocine-6,12-dione and 3-morpholino-n-propyl chloride.

Example 41

Using a procedure analogous to that described in Example 1, 5-methyl - 10 - chloro-11-[3-(4-methyl-piperazino)-n-propyl]-5,6,11,12-tetrahydro - dibenzo[b,f][1,5]-diazocine-6,12-dione of the formula

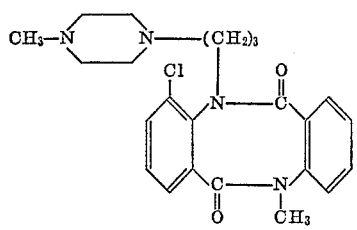

was prepared from 5-methyl-10-chloro-5,6,11,12-tetrahydro-dibenzo[b,f][1,5]diazocine-6,12-dione and 3-(4-methyl-piperazino)-n-propyl chloride. Its bis-maleate had a melting point of 173° C.

Example 42

Using a procedure analogous to that described in Example 1, 5-methyl-10-chloro-11-(2-morpholino-ethyl)-5,6,11,12 - tetrahydro - dibenzo[b,f][1,5]diazocine - 6,12-dione, M.P. 186° C., was prepared from 5-methyl-10-chloro-5,6,11,12-tetrahydro - dibenzo[b,f][1,5]diazocine-6,12-dione and 2-morpholino-ethyl chloride.

Example 43

Using a procedure analogous to that described in Example 1, 3,9 - dichloro - 5 - methyl-11-(2-diethylamino-ethyl)-5,6,11,12-tetrahydro - dibenzo[b,f][1,5]diazocine-6,12-dione, M.P. 145° C., of the formula

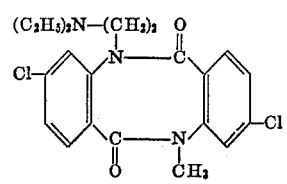

was prepared from 3,9-dichloro-5-methyl-5,6,11,12-tetrahydro-dibenzo[b,f][1,5]diazocine - 6,12 - dione and 2-diethylaminoethyl chloride.

Example 44.—Preparation of 11-[2-diethylamino-ethyl]-5,6,11,12-tetrahydro - dibenzo[b,f][1,5]diazocine-6,12-dione by method C A mixture of 4.2 gm. (0.0114 mol) of N-(2-diethylaminoethyl)-N-anthranoyl-anthranilic acid methyl ester, M.P. 91° C., 20 cc. of methanol and 3.5 cc. of 4 N sodium hydroxide was allowed to stand at room temperature for three days. Thereafter, the reaction solution was made acid with hydrochloric acid and was then evaporated. Without further purification, the residue, the hydrochloride of N-(2-diethylamino-ethyl) - N - anthranoyl - anthranilic acid, was suspended in 50 cc. of dimethylformamide, the suspension was admixed with a solution of 5 gm. of dicyclohexylcarbodiimide in 30 cc. of tetrahydrofuran, and the mixture was allowed to stand for two days at room temperature. Thereafter, the dicyclohexylurea which had precipitated out was filtered off, the filtrate was evaporated in vacuo, and the oily residue was taken up in a mixture of 50 cc. of benzene and 1 N hydrochloric acid. The aqueous acid phase was separated and made alkaline with sodium hydroxide, whereupon an oil separated out. The oil was dissolved in ether, the ethereal solution was admixed with ethereal oxalic acid, the semi-crystalline precipitate formed thereby was isolated and again admixed with sodium hydroxide, and the product obtained was recrystallized benzene/petroleum ether. 2.0 gm. (48% of theory) of 11-(2-diethylamino - ethyl)-5,6,11,12-tetrahydro-dibenzo[b,f][1,5]diazocine-6,12-dione, M.P. 147° C., of the formula

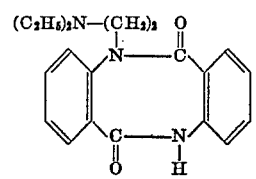

were obtained.

Example 45.—Preparation of 5-methyl-11-[3-(4-methylpiperazino) - n - propyl] - 5,6,11,12-tetrahydro-dibenzo[b,f][1,5]diazocine-6,12-dione by method A in polar solvent (a) In aqueous sodium hydroxide.—12.6 gm. (0.05 mol) of 5-methyl-5,6,11,12-tetrahydro-dibenzo[b,f][1,5]- diazocine-6,12-dione and 2.6 gm. (0.065 mol) of sodium hydroxide were dissolved in 75 cc. of water by briefly heating the mixture to 80° C. Thereafter, 9.7 gm. (0.055 mol) of 3-(4-methyl-piperazino)-n-propyl chloride were added to the solution, and the mixture was heated for 75 minutes at 100° C. and then allowed to cool. The crystalline substance which separated out was collected by vacuum filtration, washed with water and recrystallized from acetone. It had a melting point of 71–73° C. and was identified to be the pentahydrate of 5-methyl-11-[3-(4-methyl - piperazino)-n-propyl]-5,6,11,12 - tetrahydrodibenzo[b,f][1,5]diazocine-6,12-dione. This product was dissolved in ethanol, the solution was acidified with maleic acid, and the precipitate formed thereby was isolated; it had a melting point of 190-191° C. and was identified to be the bis-hydrogenmaleate of 5-methyl-11-[3-(4-methyl-piperazino)-n-propyl]-5,6,11,12 - tetrahydrodibenzo[b,f][1,5]diazocine-6,12-dione. The yield was 25 gm. (80% of theory).

(b) In methanol in the presence of sodium methylate.—12.6 gm. (0.05 mol) of 5-methyl-5,6,11,12-tetrahydro-dibenzo[b,f][1,5]diazocine-6,12-dione were dissolved by warming in a sodium methylate solution prepared from 1.2 gm. (0.052 gm.-atoms) of sodium and 100 cc. of methanol. The resulting solution was admixed with 11.5 gm. (0.064 mol) of 3-(4-methyl-piperazino)-n-propyl chloride, the mixture was boiled for three hours, then evaporated, and the residue was taken up in water. The aqueous solution was cooled, and the precipitate formed thereby was recrystallized from acetone, yielding the pentahydrate of 5-methyl-11-[3-(4-methyl-piperazino)-n-propyl]-5,6,11,12-tetrahydro - dibenzo[b,f][1,5]diazocine-6,12-dione. This product was dissolved in ethanol, and the solution was acidified with maleic acid, yielding 67.5% of theory of the bis-hydrogen maleate, M.P. 190° C.

(c) In methanol in the presence of potassium carbonate.—A mixture of 6.3 gm. (0.025 mol) of 5-methyl-5,6,-11,12-tetrahydro - dibenzo[b,f][1,5]diazocine-6,12-dione, 5.3 gm. (0.03 mol) of 3-(4-methyl-piperazino)-n-propyl chloride, 55 cc. of methanol and 4.1 gm. (0.03 mol) of potassium carbonate was boiled for two hours. Thereafter, the inorganic insoluble matter was vacuum-filtered off, the filter cake was washed with methanol, the filtrate was evaporated, and the residue was taken up in water. The pentahydrate of 5-methyl-11-[3-(4-methyl-piperazino)-n-propyl]-5,6,11,12-tetrahydro - dibenzo[b,f][1,5]-diazocine-6,12-dione was isolated from the aqueous solution as described under (a) and (b) above, and was then converted into the bis-hydrogenmaleate, M.P. 190° C.; the yield was 71% of theory.

Example 46

Using a procedure analogous to that described in Example 45(a), 5-methyl-8-bromo-11-[3-(4-methyl-piperazino)-n-propyl]-5,6,11,12-tetrahydro - dibenzo[b,f][1,5]-diazocine-6,12-dione was prepared from 5-methyl-8-bromo-5,6,11,12-tetrahydro - dibenzo[b,f][1,5]diazocine-6,12-dione and 3-(4-methyl-piperazino)-n-propyl chloride. Its dihydrochloride had a melting point of 263° C. (decomposition).

Example 47

Using a procedure analogous to that described in Example 45(a), 2-chloro-5-methyl-11-[3-(4-methyl-piperazino)-n-propyl]-5,6,11,12-tetrahydro - dibenzo[b,f][1,5]-diazocine-6,12-dione was prepared from 2-chloro-5-methyl-5,6,11,12-tetrahydro - dibenzo[b,f][1,5]diazocine-6,12-dione and 3-(4-methyl-piperazino)-n-propyl chloride. Its bis-hydrogenmaleate had a melting point of 169° C.

Example 48

Using a procedure analogous to that described in Example 45(a), 5-methyl-7-chloro-11-[3-(4-methyl-piperazino)-n-propyl]-5,6,11,12-tetrahydro - dibenzo[b,f][1,5]- diazocine-6,12-dione was prepared from 5-methyl-7-chloro-5,6,11,12-tetrahydro - dibenzo[b,f][1,5]diazocine-6,12-dione and 3-(4-methyl-piperazino)-n-propyl chloride. Its bis-hydrogenmaleate had a melting point of 170° C.

Example 49

Using a procedure analogous to that described in Example 45(b), 5 - methyl-11-[3-dimethylamino - n - propyl]-5,6,11,12 - tetrahydro - dibenzo[b,f][1,5]diazocine-6,12-dione, M.P. 124° C., was prepared from 5-methyl-5,6,11,12 - tetrahydro - dibenzo[b,f][1,5]diazocine-6,12-dione and 3-dimethylamino-n-propyl chloride.

Example 50

Using a procedure analogous to that described in Example 45(b), 5 - methyl - 9 - chloro-11-(3-piperidino-n-propyl)-5,6,11,12-tetrahydro - dibenzo[b,f][1,5]diazocine-6,12-dione, M.P. 112° C., was prepared from 5-methyl-9-chloro-5,6,11,12-tetrahydro - dibenzo[b,f][1,5]diazocine-6,12-dione and 3-piperidino-n-propyl chloride.

Example 51

Using a procedure analogous to that described in Example 45(c), 2-chloro-5-methyl-11-(2-diethyl-aminoethyl)-5,6,11,12-tetrahydro - dibenzo[b,f][1,5]diazocine-6,12-dione, M.P. 103° C., was prepared from 2-chloro-5-methyl-5,6,11,12-tetrahydro - dibenzo[b,f][1,5]diazocine-6,12-dione and 2-diethylamino-ethyl chloride.

Example 52

Using a procedure analogous to that described in Example 45(c), 5-methyl - 7 - chloro-11-(2-morpholinoethyl)-5,6,11,12-tetrahydro - dibenzo[b,f][1,5]diazocine-6,12-dione, M.P. 157° C., was prepared from 5-methyl-7-chloro-5,6,11,12-tetrahydro - dibenzo[b,f][1,5]diazocine-6,12-dione and 2-morpholino-ethyl chloride.

Example 53.—Preparation of 5-methyl-11-[3-(4-methyl-piperazino) - n - propyl]-5,6,11,12-tetrahydro-dibenzo[b,f][1,5]diazocine-6,12-dione by method A in ethanol A solution of 2.5 gm. (0.01 mol) of 5-methyl-5,6,11,12-tetrahydro-dibenzo[b,f][1,5]diazocine-6,12-dione, 1.8 gm. (0.01 mol) of 3-(4-methyl-piperazino)-n-propyl chloride and 2.1 gm. (0.01 mol) of benzyl-triethylammonium hydroxide in 25 cc. of ethanol was boiled for three hours. Thereafter, the reaction solution was evaporated, and the residue was taken up in water. The reaction product, 5-methyl-11-[3-(4-methyl - piperazino)-n-propyl]-5,6,11,12-tetrahydro-dibenzo[b,f][1,5]diazocine-6,12-dione, isolated from the aqueous solution as described in the preceding examples was dissolved in ethanol and reprecipitated as its bis-hydrogenmaleate, M.P. 189–190° C. The yield was 4.8 gm. (77.5% of theory).

The compounds according to the present invention, that is, those embraced by Formula I above and their nontoxic, pharmacologically acceptable acid addition salts, have useful pharmacodynamic properties. More particularly, they exhibit very effective antitussive and antiemetic activities in warm-blooded animals.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, suppositories, solutions, suspensions, syrups, capsules, wafers and the like. One dosage unit of the compounds according to the present invention is from 25 to 100 mgm., and the average daily dosage is from 75 to 300 mgm.

The following examples illustrate a few dosage unit compositions comprising a compound of the instant invention as an active ingredient. The parts are parts by weight unless otherwise specified.

Example 54.—Tablets

The tablet composition is compounded from the following ingredients:

| | Parts |
|---|---|
| 5 - methyl - 11 - [3 - (4 - methyl-piperazino)-n-n - propyl] - 5,6,11,12 - tetrahydro - dibenzo [b,f][1,5]diazocine - 6,12 - dione bis-hydrogenmaleate | 50.0 |
| Secondary calcium phosphate, anhydrous | 120.0 |
| Colloidal silicic acid | 10.0 |
| Corn starch | 30.0 |
| Polyvinylpyrrolidone | 5.0 |
| Maleic acid | 3.0 |
| Potato starch | 20.0 |
| Magnesium stearate | 2.0 |
| Total | 240.0 |

Compounding procedure.—The tetrahydro-dibenzodiazocine-dione compound, the calcium phosphate, the colloidal silicic acid and the corn starch are intimately admixed with each other, the mixture is moistened with an ethanolic 10% solution of the polyvinyl-pyrrolidone which also has the maleic acid dissolved therein, and the moist mass is granulated by forcing it through a 1.5 mm. mesh screen. The granulate is dried at 45° C. and again passed through the screen, throughly admixed with the potato starch and the magnesium stearate, and then pressed into 240 mgm. tablets. Each tablet contains 50 mgm. of the active ingredient.

Example 55.—Coated pills

The tablets prepared in accordance with Example 54 are coated in customary fashion with a thin shell consisting essentially of talcum and sugar, and the coated tablets are polished with beeswax. Each coated tablet weighs approximately 350 mgm. and the same active ingredient content as the uncoated tablets of Example 54.

Example 56.—Suppositories

The suppository composition is compounded from the following ingredients:

| | Parts |
|---|---|
| 5 - methyl 11 - [3 - (4 - methyl-piperazino)-n-propyl] - 5,6,11,12 - tetrahydro - dibenzo [b,f][1,5]diazocine - 6,12 - dione bis-hydrogen maleate | 60.0 |
| Cocoa butter | 1640.0 |
| Total | 1700.0 |

Compounding procedure.—The cocoa butter is melted and cooled to 40° C., and the tetrahydro - dibenzodiazocine - dione compound is stirred into it with the aid of an immersion homogenizer. The mixture is then poured into cooled suppository molds, each holding 1700 mgm. of the mixture. Each suppository contains 60 mgm. of the active ingredient.

Example 57.—Drop solution

The solution is compounded from the following ingredients:

| | Parts by volume |
|---|---|
| 5 - methyl - 11 - [3 - (4 - methyl - piperazino) n - propyl] - 5,6,11,12 - tetrahydro - dibenzo [b,f][1,5]diazocine - 6,12 - dione bis-hydrogenmaleate | 6.0 |
| p-Hydroxybenzoic acid methyl ester | 0.035 |
| p-Hydroxybenzoic acid propyl ester | 0.015 |
| Oil of anise | 0.05 |
| Menthol | 0.06 |
| Ethanol, pure | 10.0 |
| Saccharin sodium | 1.0 |
| Glycerin | 15.0 |
| Distilled water, q. s. ad | 100.0 |

Compounding procedure.—The p-hydroxybenzoic acid esters, the oil of anise and the menthol are dissolved in the ethanol (Solution A). The saccharin sodium and the tetrahydro-dibenzodiazocine-dione compound are dissolved in the distilled water, and the glycerine is added to the aqueous solution (Solution B). Solutions A and B are thoroughly admixed with each other, and the mixed solution is filtered until clear. 1 cc. of the solution (about 20 drops) contains 60 mgm. of the active ingredient.

Example 58.—Cough syrup

The syrup is compounded from the following ingredients:

| | Parts by volume |
|---|---|
| 5 - methyl - 11 - [3 - (4 - methyl - piperazino) n - propyl] - 5,6,11,12 - tetrahydro - dibenzo [b,f][1,5]diazocine - 6,12 - dione bis-hydrogenmaleate | 0.5 |
| Sugar | 70.0 |
| Tartaric acid | 0.3 |
| Secondary sodium phosphate·2H$_2$O | 1.2 |
| Saccharin sodium | 0.2 |
| p-Hydroxybenzoic acid methyl ester | 0.07 |
| p-Hydroxybenzoic acid propyl ester | 0.03 |
| Essence of eucalyptus-menthol | 0.1 |
| Essence of raspberry | 0.02 |
| Ethanol, pure | 2.0 |
| Distilled water, q. s. ad | 100.0 |

Compounding procedure.—About 50 parts by volume of water are heated to 80° C., and the p-hydroxybenzoic acid esters, the sugar, the saccharin sodium, the tartaric acid, the secondary sodium phosphate and the tetrahydro-dibenzodiazocine-dione compound are dissolved therein. Thereafter, a solution of the essence of eucalyptus-menthol and the essence of raspberry in the ethanol is stirred into the aqueous solution. The combined solution is diluted with the remaining amount of distilled water to the required volume and is then filtered until clear 10 cc. of the resulting syrup contain 50 mgm. of the active ingredient.

Example 59.—Hypodermic solution

The solution is compounded from the following ingredients:

| | Parts by volume |
|---|---|
| 5-methyl-11-[3 - (4 - methyl-piperazino)-n-propyl]-5,6,11,12 - tetrahydro - dibenzo[b,f][1,5]diazocine-6,12-dione bis-hydrogenmaleate | 25.0 |
| Sodium chloride | 15.0 |
| Distilled water, q.s.ad | 2,000.0 |

Compounding procedure.—The solid ingredients are dissolved in a sufficient amount of distilled water, and the solution is diluted with additional distilled water to the desired volume, filtered until free from suspended particles and filled into 2 cc. ampules, which are subsequently sterilized at 120° C. for 20 minutes and sealed. Each ampule contains 25 mgm. of the active ingredient.

Example 60.—Gelatin capsules

The capsule filler composition is compounded from the following ingredients:

| | Parts |
|---|---|
| 5-methyl-11 - [3-(4-methyl-piperazino)-n-propyl]-5,6,11,12 - tetrahydro - dibenzo[b,f][1,5]diazocine-6,12-dione bis-hydrogenmaleate | 50.0 |
| Potato starch | 40.0 |
| Talcum | 10.0 |
| Total | 100.0 |

Compounding procedure.—The individual ingredients are intimately admixed with each other, and 100 mgm.-portions of the mixture are filled into hard gelatin capsules of suitable size. Each capsule contains 50 mgm. of the active ingredient.

Although the above dosage unit examples illustate only one specific compound of the present invention as an active ingredient, it should be understood that any of the other compounds embraced by Formula I above or a non-toxic, pharmacologically acceptable acid addition salt thereof may be substituted for the particular active ingredient in Examples 54 through 60. Moreover, the amount of active ingredient in these examples may be varied within the dosage unit limits set forth above, and the amounts and nature of the inert carrier components may be varied to meet particular requirements.

While the present invention has been illustrated with the aid of certain specific embodiments thereof, it will be readily apparent to others skilled in the art that the invention is not limited to these particular embodiments, and that various changes and modification may be made without departing from the spirit of the invention or the scope of the appended claims.

We claim:

1. A compound of the formula

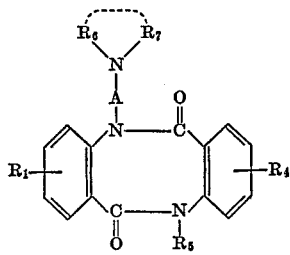

wherein $R_1$ and $R_4$ are each hydrogen or halogen, $R_5$ is lower alkyl, allyl or benzyl, $R_6$ and $R_7$ are each lower alkyl or, together with each other and the nitrogen atom to which they are attached, form a pyrrolidino, piperidino, morpholino or N'-methyl-piperazino ring, and A is ethylene or propylene, or a non-toxic, pharmacologically acceptable acid addition salt thereof.

2. A compound according to claim 1, wherein $R_1$ and $R_4$ are hydrogen, $R_5$ is methyl, $R_6$ and $R_7$, together with each other and the nitrogen to which they are attached, form the N'-methyl-piperazino ring, and A is n-propylene.

3. A compound according to claim 1, wherein $R_1$ and $R_4$ are hydrogen, $R_5$ is methyl, $R_6$ and $R_7$ are ethyl, and A is ethylene.

4. A compound according to claim 1, wherein $R_1$ is 8-chloro, $R_4$ is hydrogen, $R_5$ is methyl, $R_6$ and $R_7$ together with each other and the nitrogen atom to which they are attached form the morpholino ring, and A is n-propylene.

5. A compound according to claim 1, wherein $R_1$ and $R_4$ are hydrogen, $R_5$ is methyl, $R_6$ and $R_7$ together with each other and the nitrogen atom to which they are attached form the morpholino ring, and A is n-propylene.

6. A compound according to claim 1, wherein $R_1$ and $R_4$ are hydrogen, $R_5$ is methyl, $R_6$ and $R_7$ are methyl, and A is n-propylene.

7. A compound according to claim 1, wherein $R_1$ is 8-chloro, $R_4$ is hydrogen, $R_5$ is methyl, $R_6$ and $R_7$ are methyl, and A is n-propylene.

8. A compound according to claim 1, wherein $R_1$ is 9-chloro, $R_4$ is hydrogen, $R_5$ is methyl, $R_6$ and $R_7$ together with each other and the nitrogen atom to which they are attached form the N'-methyl-piperazino ring, and A is n-propylene.

9. The process of preparing a compound according to claim 1, which comprises subjecting a compound of the formula

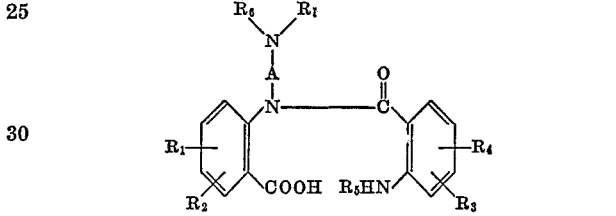

wherein $R_1$ through $R_7$ and A have the same meanings as in claim 1, to a cyclization reaction with carbodiimide at room temperature or with cyanamide at elevated temperatures, and recovering the reaction product.

References Cited

UNITED STATES PATENTS 3,409,608  11/1968  Topliss _____ 260—239.3

OTHER REFERENCES

Jilek et al. Coll. Czech Chem. Comm., vol. 30 (2), pp. 445–62 (1965), (February).

NORMA S. MILESTONE, Primary Examiner

R. T. BOND, Assistant Examiner

U.S. Cl. X.R.

424—244, 248, 250, 267, 274

UNITED STATES PATENT OFFICE
CERTIFICATE OF CORRECTION

Patent No. 3,470,152  September 30, 1969

Ottmar Zipp et al.

It is certified that error appears in the above identified patent and that said Letters Patent are hereby corrected as shown below:

Column 8, second formula, cancel "-Br".

Signed and sealed this 26th day of May 1970.

(SEAL)
Attest:

Edward M. Fletcher, Jr.
Attesting Officer

WILLIAM E. SCHUYLER, JR.
Commissioner of Patents